Patented July 3, 1934

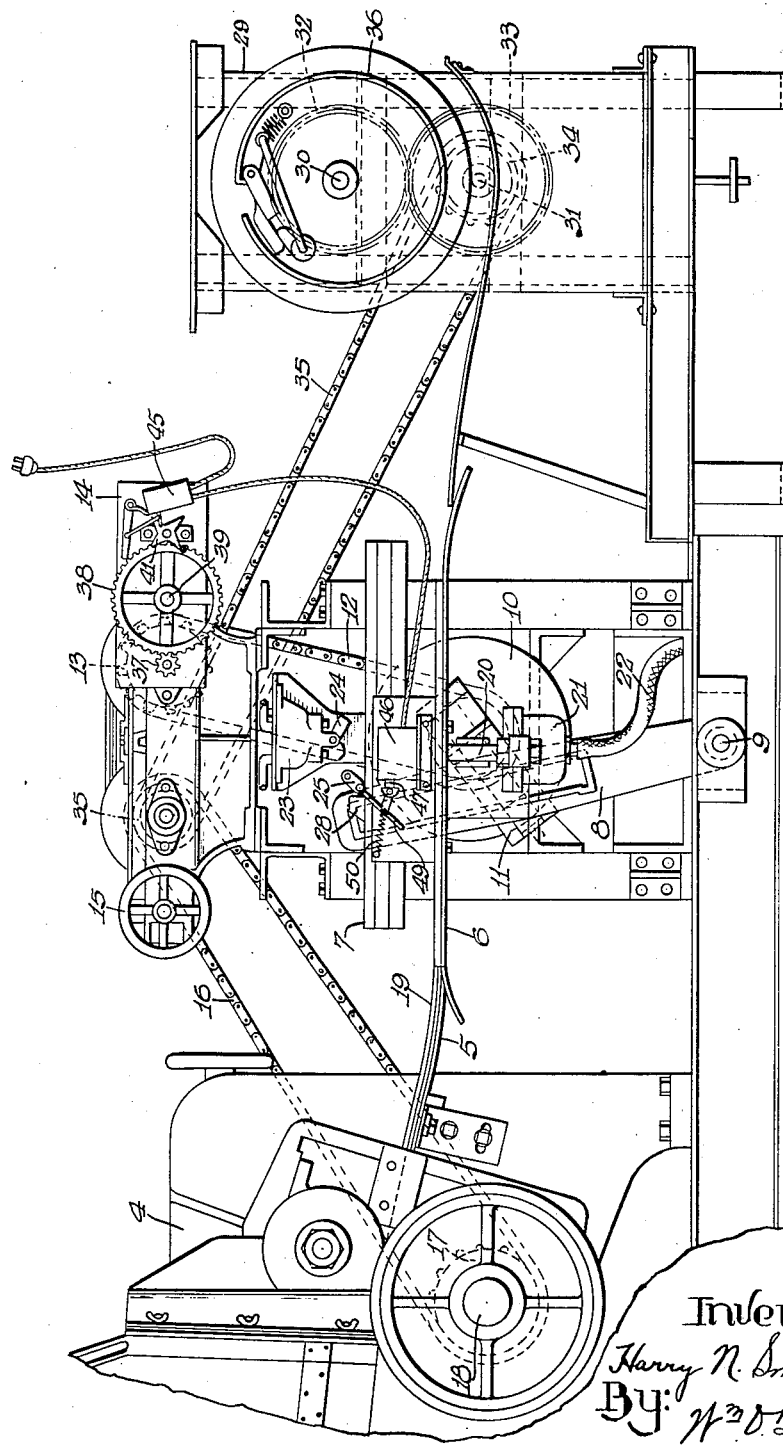

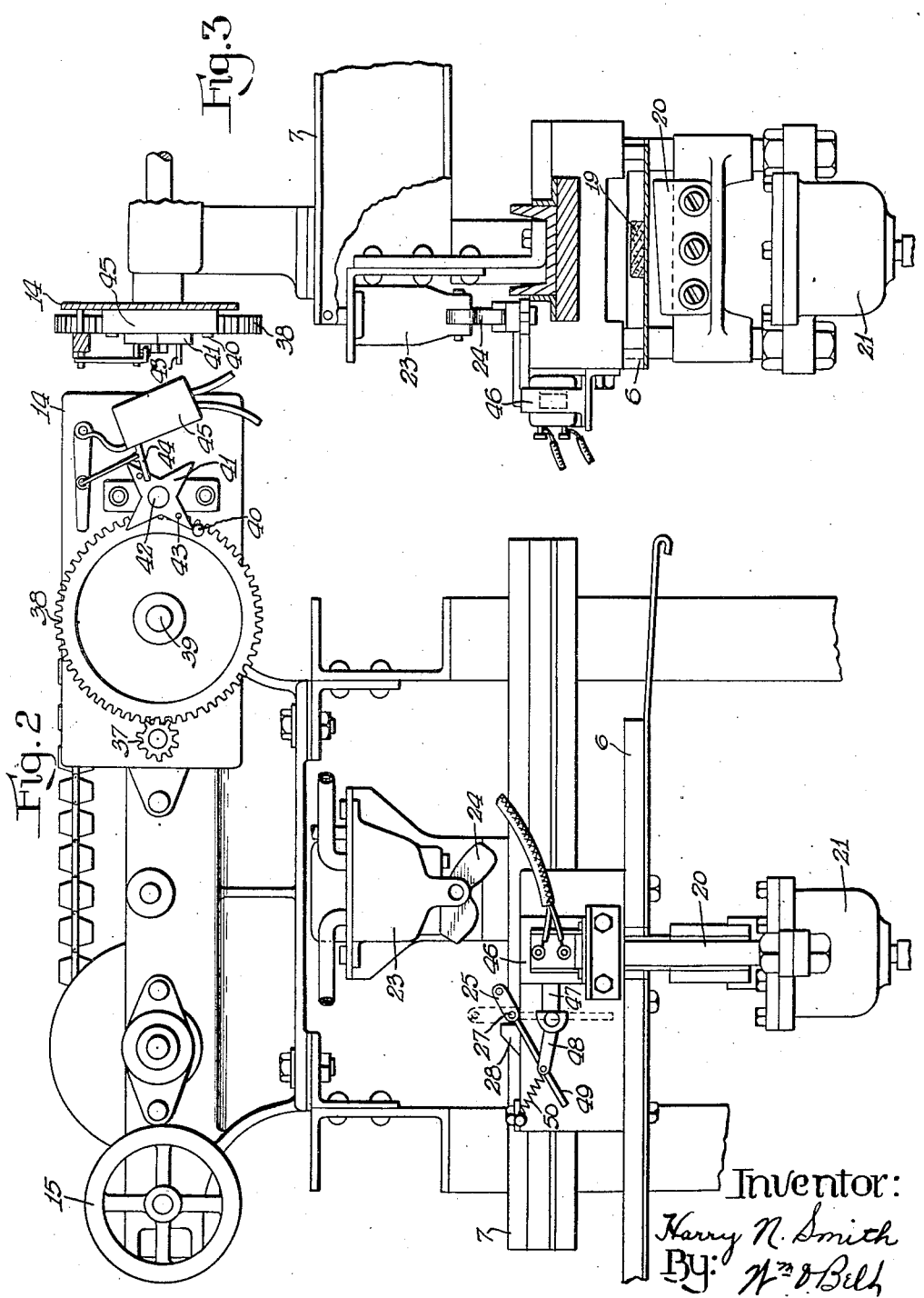

1,965,110

UNITED STATES PATENT OFFICE 1,965,110

MACHINE FOR CUTTING FRICTION ELEMENTS

Harry N. Smith, Detroit, Mich., assignor to American Brakeblok Corporation, Detroit, Mich., a corporation of New York Original application October 29, 1930, Serial No. 491,944. Divided and this application May 22, 1933, Serial No. 672,274

7 Claims. (Cl. 164—48)

This is a division of my application Serial No. 491,944, filed October 29, 1930.

This invention relates to cutting machines and is particularly adapted for severing strip material. The invention is especially useful in connection with the manufacture of friction elements for the brakes of automotive vehicles and the like.

The primary objects of the invention are to cut friction elements of predetermined length from a continuously fed strip without interrupting movement thereof, to cut sections of varied lengths from the strip, to provide a simple adjustment for varying the lengths of the sections, to move the severing mechanism in timed relation with the movement of the strip, and to operate the severing device after a predetermined length of strip material has been wound in a winding or reeling machine.

A selected embodiment of my invention is illustrated in the accompanying drawings wherein Fig. 1 is a side elevation of the cutting machine in connection with a forming machine and a reeling machine;

Fig. 2 is an enlarged fragmentary elevational view of the cutting machine; and

Fig. 3 is an end view of the machine as illustrated in Fig. 2.

In the accompanying drawings I have illustrated my invention as adapted for cutting friction elements of the kind used in the brakes of automotive vehicles and the like but it is to be understood that this is but an illustrative embodiment for the invention is susceptible to many other uses. In the drawings I show a strip forming machine 4 which may be of the kind illustrated and described in my co-pending application, Serial No. 491,375, filed October 27, 1930, now Patent No. 1,920,023, patented July 25, 1933. The strip is delivered from the forming machine over a delivery table 5 and is directed onto the carriage 6 of a cutting machine 7.

The carriage 6 is reciprocated by a rocker arm 8 pivotally mounted on the frame of the cutting machine, as indicated at 9. This rocker is connected to a driving disc 10 by suitable variable connecting means 11. The disc 10 is driven by a chain 12 which, in turn, is driven by a power delivery sprocket 13 of the speed varying device, generally indicated by 14, which includes an adjusting wheel 15. Power is supplied to the speed varying mechanism 14 through a chain 16 which is connected to the sprocket 17 on the main drive shaft 18 of the machine 4. The shaft 18 is driven from a suitable source of power. Since the forming machine 4 and the cutting machine 7 are driven from the same source of power, these machines may be operated in timed relation and movement of the carriage 6 may be timed to the movement of the strip 19 from the machine 4 onto the carriage 6.

The cutting machine may be operated to sever the strip into short sections of predetermined length and to this end a severing device 20 is mounted on the carriage 6. The severing device is pneumatically operated and air is supplied to the cylinder 21 of the severing device through a hose 22. The flow of air through this hose is controlled by a valve 23. The valve includes a trigger 24 operable by a finger 25 pivotally mounted on the carriage 6, as indicated at 27.

The finger 25 is arranged in the dotted line position of Fig. 2 when the strip 21 is to be severed into short sections of predetermined length. During movement of the carriage toward the right, as viewed in Fig. 2, the finger is held against counterclockwise movement by the abutment thereof with the stop 28 and therefore when the finger 25 engages the trigger 24 during movement of the carriage to the right the valve 23 is operated to permit flow of air to the cylinder 21 whereby the severing device is operated.

After operation of the severing device the carriage 6 continues to the end of the predetermined stroke and then moves toward the left, as viewed in Fig. 2, and during this movement the finger 25 may freely pivot in a clockwise direction and hence the trigger 24 is not operated thereby until the finger again engages the trigger when the carriage is moving toward the right in the next operation of the carriage.

The severing device is not always operated to sever the strip 21 into short sections of predetermined length for sometimes the strip is adapted to be wound in a suitable winding machine and under these conditions the severing device is not operated until a predetermined length of the strip has been wound in the winding machine. For example, a strip twenty-five feet in length is often wound. Such strips are utilized in the replacement of friction elements worn out in service. It is much easier for a dealer to carry a length of material in stock and to cut from this length sections of proper length to meet the requirements of a particular job than to attempt to carry a large number of sections each adapted for a special use.

I therefore construct the cutting machine so that the severing device will not be operated once during each back and forth reciprocation of the carriage 6 as is done when the strip is to be severed into short sections.

As illustrated, the cutting machine is to be so used with a winding machine, generally indicated by 29, and which includes a suitable frame having supporting rails on which bearings are mounted in which a shaft 30 is journaled. Another shaft 31 is journaled in bearings carried by other supporting rails in the winding machine. Meshed gears 32 and 33 are respectively fast on the shafts 30 and 31. A sprocket 34 is fast on the shaft 31 and a chain 35 is directed thereabout, and this chain is also directed about a sprocket 35 fast on the shaft in the speed varying device carrying the sprocket about which the chain 16 is directed so that the winding machine 29 may also be operated with the forming machine 4 and the cutting machine 7.

The end of the strip 19 is adapted to be clamped to the winding drum 36 in the winding machine 29 in any proper manner, as, for example, that disclosed in my application, Serial No. 491,944, filed October 29, 1930, of which this application is a division.

The severing device 20 is operated when a predetermined length of the strip 19 has been wound on the drum 36 and I provide the following mechanisms for effecting such operation of the severing device.

A pinion 37 is fast on one of the shafts of the speed varying device 14 and meshes with a spur gear 38 mounted on the stud shaft 39. A pin 40 projects from the side of the spur gear 38 and during rotation of the gear 38 successively engages the arms of the star wheel 41 rotatably mounted at 42 on the frame of the speed varying device 14. Pins 43 are provided on diametrically opposite arms of the star wheel 41 which successively engage the operating lever 44 of the switch 45. The switch 45 controls the operation of the solenoid 46 mounted on the carriage 6. The solenoid includes an armature 47 and a link 48 is pivotally connected to the free end of the armature. This link is also pivotally connected to the depending leg 49 of the finger 25. A spring 50 is detachably connected to the leg 49 and normally holds the finger 25 in the full line position of Fig. 2. When the switch 45 is closed by the operation of the lever 44 thereof by a pin 43, the solenoid is energized and the finger 25 is drawn into the full line position of Fig. 2 and during the succeeding movement of the carriage 6 toward the right, as viewed in Fig. 2, the finger 25 engages the trigger 24 and operates the valve 23.

Rotation of the gear 38 is synchronized with the movement of the strip 19 and by properly positioning the pin 40 on the gear 38 the operation of the valve 23 and the subsequent operation of the severing device 20 may be accurately timed so that the severing device will be operated when a predetermined length of the strip material has been wound on the drum 36.

By omitting one of the pins 43 a strip of twice the length of that severed when both pins are provided may be wound on the drum before the severing device operates and by adding other pins 43 shorter lengths of the strip may be severed after winding on the drum.

After operation of the severing device, the wound strip is quickly removed from the drum 36 and the forward end of the strip 19 is again connected to the drum.

The operation of the cutting machine for severing short sections of predetermined length is somewhat similar to that disclosed in my Patent No. 1,883,025, patented October 18, 1932. Such operation of the machine is possible for the spring 50 is detachably connected to the leg 49 and when it is disconnected from this leg the finger 25 assumes the dotted line position of Fig. 2.

However, by providing the solenoid 46 and the cooperating parts I am enabled to operate the machine in such a way that the severing device does not operate during each of the complete back and forth reciprocations of the carriage 6 for when the spring 50 is connected to the leg 49 the severing is only brought about by the closing of the switch 45 and the energizing of the solenoid 46. As explained, the time at which the switch 45 is closed may be varied by properly positioning the pins on the star wheel 43. Such control of the severing device enables strips of related lengths to be cut for when two pins are provided strips of a certain length are cut but when one pin is provided strips of twice this length are cut whereas when four pins are provided strips of a length equal to one-half of the length of the strips cut when two pins are used are severed from the continuously fed strip.

While I have illustrated and described a selected embodiment of my invention it is to be understood that this is capable of variation and modification and I therefore do not wish to be limited to the precise details set forth but desire to avail myself of such changes and alterations as fall within the scope of the following claims:

I claim:

1. In a device for severing strip material passing therethrough, severing means past which the strip is directed, means for controlling the operation of said severing means, means for operating said controlling means and including a pivotally mounted member, spring means for holding said pivotally mounted member in an inoperative position, electrically operated means for moving said pivotally mounted member into operative position, and means for energizing and de-energizing said electrically operated means when a predetermined length of said strip has passed through said device whereby said pivotally mounted member is positioned to actuate said severing means, said spring means returning said pivotally mounted member to inoperative position when said electrically operated means is de-energized.

2. In a device for severing strip material passing therethrough, a cutting device including a carriage carrying severing means, means for moving said carriage in one direction in synchronism with the movement of the strip in said direction and for moving said carriage in the opposite direction, means controlling the operation of said severing means, and means for rendering said severing means operative during a movement of the carriage with said strip whereby a predetermined length is severed from said strip and including a variable portion for altering the operation of said cutting means whereby said strip is severed into a length which is an even multiple of said predetermined length.

3. In a device for severing strip material passing therethrough, a cutting device including a carriage carrying severing means, means moving the carriage in one direction in synchronism with the movement of the strip in said direction and for moving the carriage in the opposite direction, means controlling the operation of said severing means, and means for rendering said severing means operative during a movement of the carriage with said strip whereby said strip is severed into a predetermined length and including an electric circuit embodying a switch and means for operating said switch, said switch operating means including variable means for altering the operation of said cutting means to effect severance of said strip into lengths which are an even multiple of said predetermined length.

4. In a device for severing strip material passing therethrough, severing means, a carriage over which the strip material is fed, means for moving the carriage in timed relation with the strip, means controlling operation of said severing means, a pivotally mounted member for operating said controlling means, spring means for holding said pivotally mounted member in inoperative position, a solenoid for moving said pivotally mounted member into operative position, and means for energizing and de-energizing said solenoid to control operation of said pivotally mounted member whereby said pivotally mounted member may be arranged in operative position when a predetermined length of said strip material has moved past said severing means to thereupon operate said severing means, said spring means returning said pivotally mounted member to inoperative position upon de-energizing of said solenoid.

5. In a device for severing strip material passing therethrough, severing means, a carriage over which the strip material is fed, means for moving the carriage in timed relation with the strip, means controlling operation of said severing means, a solenoid, means controlled by said solenoid for regulating operation of the means controlling said severing means, and means controlling operation of said solenoid and including variable portions whereby the strip material may be selectively severed into lengths which are even multiples of a predetermined length.

6. In a device for severing strip material passing therethrough, severing means, pneumatic means for operating said severing means, a valve controlling said pneumatic means, a member controlling said valve, means for holding said member in an inoperative position, electrically operated means for moving said member into valve operating position, and means for rendering said electrically operated means operative when a predetermined length of strip material has moved past said severing means.

7. In a device for severing strip material passing therethrough, a cutting device including a carriage carrying severing means, means for moving the carriage in one direction in synchronism with movement of the strip in said direction and for moving the carriage in the opposite direction, pneumatic means for operating said severing means, a valve controlling said pneumatic means, a member on said carriage controlling said valve, means for holding said member in an inoperative position, electrically operated means on said carriage for moving said carriage into valve operating position, and means for rendering said electrically operated means operative when a predetermined length of strip material has moved past said severing means.

HARRY N. SMITH.